United States Patent
Cheng et al.

(10) Patent No.: US 9,030,979 B2
(45) Date of Patent: May 12, 2015

(54) REDUCING POWER CONSUMPTION IN MULTI-THREADED PROCESSOR MOBILE DEVICES

(75) Inventors: Steven D. Cheng, San Diego, CA (US); Tom Chin, San Diego, CA (US); Guangming Shi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 120 days.

(21) Appl. No.: 13/105,411

(22) Filed: May 11, 2011

(65) Prior Publication Data

US 2012/0287831 A1 Nov. 15, 2012

(51) Int. Cl.
*G08C 17/00* (2006.01)
*H04B 7/185* (2006.01)
*H04W 52/02* (2009.01)

(52) U.S. Cl.
CPC ........ *H04W 52/0229* (2013.01); *H04W 52/028* (2013.01); *Y02B 60/50* (2013.01)

(58) Field of Classification Search
CPC .......................... H04W 52/028; H04W 52/0229
USPC .................................................. 370/311, 318
See application file for complete search history.

(56) References Cited

U.S. PATENT DOCUMENTS

| | | | |
|---|---|---|---|
| 6,668,159 B1* | 12/2003 | Olofsson et al. ........... | 455/67.11 |
| 7,650,522 B2 | 1/2010 | Linsley-Hood et al. | |
| 7,813,772 B2 | 10/2010 | Camp, Jr. et al. | |
| 7,907,965 B2 | 3/2011 | Pilgram et al. | |
| 2007/0211655 A1 | 9/2007 | Lin et al. | |
| 2008/0049660 A1* | 2/2008 | Kwan et al. ................... | 370/318 |
| 2009/0086660 A1 | 4/2009 | Sood et al. | |
| 2009/0088199 A1 | 4/2009 | Nurminen et al. | |
| 2010/0248646 A1 | 9/2010 | Yamazaki et al. | |
| 2010/0293401 A1* | 11/2010 | de Cesare et al. ............ | 713/320 |
| 2011/0051639 A1 | 3/2011 | Ramakrishnan et al. | |
| 2011/0105102 A1 | 5/2011 | Jutzi et al. | |
| 2012/0002614 A1* | 1/2012 | Ekici et al. ................... | 370/329 |

FOREIGN PATENT DOCUMENTS

KR 20100122875 A 11/2010

OTHER PUBLICATIONS

International Search Report and Written Opinion—PCT/US2012/037172—ISA/EPO—Aug. 17, 2012.
Taiwan Search Report—TW101116537—TIPO—Feb. 11, 2014.

* cited by examiner

Primary Examiner — Shripal Khajuria
Assistant Examiner — Farhad Ali
(74) Attorney, Agent, or Firm — Larry Moskowitz

(57) ABSTRACT

In a multi-threaded processor mobile device, power consumption is reduced by matching a number of active processing resources with the data rate capability of a serving base station. The number of active resources may be adjusted to increase the amount of time the mobile device is in an all-waits period, where its processors are all idle at the same time. Increasing the all-waits time increases power savings. The mobile device may reduce the number of active resources to reduce power consumption or may increase the number of active resources temporarily in order to increase an all-waits period. The mobile device may also operate in a low power state by adjusting its active resources and operating at a reduced data rate, which is communicated to a base station.

10 Claims, 6 Drawing Sheets

REDUCING POWER CONSUMPTION IN MULTI-THREADED PROCESSOR MOBILE DEVICES

BACKGROUND

1. Field

Aspects of the present disclosure relate generally to wireless communication systems, and more particularly to reducing power consumption in multi-threaded processor mobile devices.

2. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

Offered is a method of controlling power consumption of a mobile device. The method includes receiving an indication of a data rate of a base station serving the mobile device. The method also includes dynamically changing a number of active resources in the mobile device based on the indicated data rate of the base station serving the mobile device.

Offered is an apparatus for controlling power consumption of a mobile device. The apparatus includes means for receiving an indication of a data rate of a base station serving the mobile device. The apparatus also includes means for dynamically changing a number of active resources in the mobile device based on the indicated data rate of the base station serving the mobile device.

Offered is a computer program product for controlling power consumption of a mobile device. The computer program product includes a non-transitory computer-readable medium having non-transitory program code recorded thereon. The program code includes program code to receive an indication of a data rate of a base station serving the mobile device. The program code also includes program code to dynamically change a number of active resources in the mobile device based on the indicated data rate of the base station serving the mobile device.

Offered is an apparatus for controlling power consumption of a mobile device. The apparatus includes a memory and a processor(s) coupled to the memory. The processor(s) is configured to receive an indication of a data rate of a base station serving the mobile device. The processor(s) is also configured to dynamically change a number of active resources in the mobile device based on the indicated data rate of the base station serving the mobile device.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
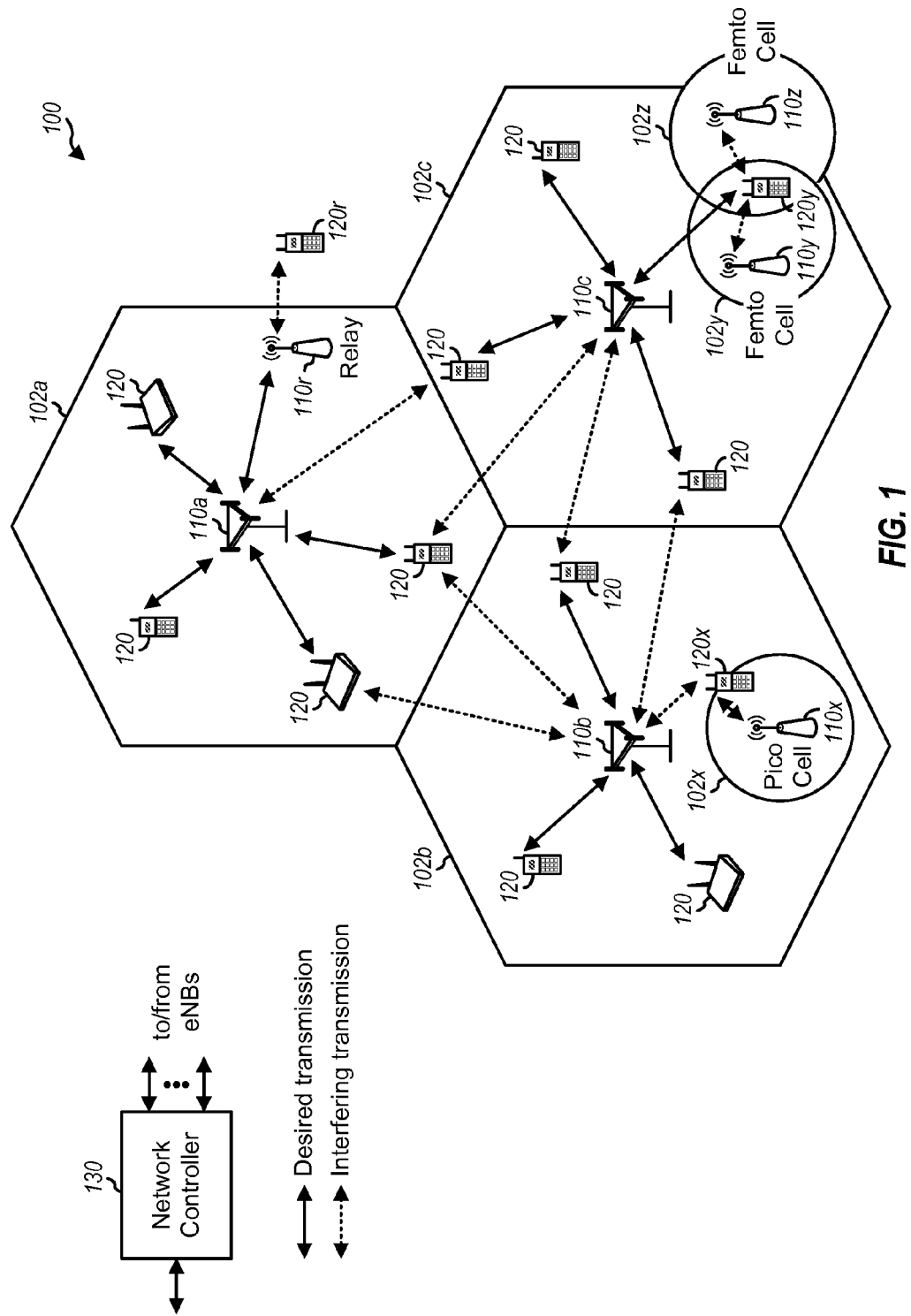
FIG. 1 is a block diagram conceptually illustrating an example of a telecommunications system.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

The techniques described herein may be used for various wireless communication networks such as CDMA, TDMA, FDMA, OFDMA, SC-FDMA and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

FIG. 1 shows a wireless communication network 100, which may be an LTE-A network, in which power consumption reduction of multi-threaded processor(s) devices may be implemented. The wireless network 100 includes a number of evolved node Bs (eNodeBs) 110 and other network entities. An eNodeB may be a station that communicates with the UEs and may also be referred to as a base station, a node B, an access point, and the like. Each eNodeB 110 may provide communication coverage for a particular geographic area. In 3GPP, the term "cell" can refer to this particular geographic coverage area of an eNodeB and/or an eNodeB subsystem serving the coverage area, depending on the context in which the term is used.

An eNodeB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNodeB for a macro cell may be referred to as a macro eNodeB. An eNodeB for a pico cell may be referred to as a pico eNodeB. And, an eNodeB for a femto cell may be referred to as a femto eNodeB or a home eNodeB. In the example shown in FIG. 1, the eNodeBs 110a, 110b and 110c are macro eNodeBs for the macro cells 102a, 102b and 102c, respectively. The eNodeB 110x is a pico eNodeB for a pico cell 102x. And, the eNodeBs 110y and 110z are femto eNodeBs for the femto cells 102y and 102z, respectively. An eNodeB may support one or multiple (e.g., two, three, four, and the like) cells.

The wireless network 100 may also include relay stations. A relay station is a station that receives a transmission of data and/or other information from an upstream station (e.g., an eNodeB, UE, etc.) and sends a transmission of the data and/or other information to a downstream station (e.g., a UE or an eNodeB). A relay station may also be a UE that relays transmissions for other UEs. In the example shown in FIG. 1, a relay station 110r may communicate with the eNodeB 110a and a UE 120r in order to facilitate communication between the eNodeB 110a and the UE 120r. A relay station may also be referred to as a relay eNodeB, a relay, etc.

The wireless network 100 may be a heterogeneous network that includes eNodeBs of different types, e.g., macro eNodeBs, pico eNodeBs, femto eNodeBs, relays, etc. These different types of eNodeBs may have different transmit power levels, different coverage areas, and different impact on interference in the wireless network 100. For example, macro eNodeBs may have a high transmit power level (e.g., 20 Watts) whereas pico eNodeBs, femto eNodeBs and relays may have a lower transmit power level (e.g., 1 Watt).

The wireless network 100 may support synchronous or asynchronous operation. For synchronous operation, the eNodeBs may have similar frame timing, and transmissions from different eNodeBs may be approximately aligned in time. For asynchronous operation, the eNodeBs may have different frame timing, and transmissions from different eNodeBs may not be aligned in time. The techniques described herein may be used for either synchronous or asynchronous operations.

In one aspect, the wireless network 100 may support Frequency Division Duplex (FDD) or Time Division Duplex (TDD) modes of operation. The techniques described herein may be used for either FDD or TDD mode of operation.

A network controller 130 may couple to a set of eNodeBs 110 and provide coordination and control for these eNodeBs 110. The network controller 130 may communicate with the eNodeBs 110 via a backhaul. The eNodeBs 110 may also communicate with one another, e.g., directly or indirectly via a wireless backhaul or a wireline backhaul.

The UEs 120 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a laptop computer, a cordless phone, a wireless local loop (WLL) station, a tablet, or the like. A UE may be able to communicate with macro eNodeBs, pico eNodeBs, femto eNodeBs, relays, and the like. In FIG. 1, a solid line with double arrows indicates desired transmissions between a UE and a serving eNodeB, which is an eNodeB designated to serve the UE on the downlink and/or uplink. A dashed line with double arrows indicates interfering transmissions between a UE and an eNodeB. The UE could include a multi-threaded processor, as described in more detail below.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for a corresponding system bandwidth of 1.25, 2.5, 5, 10 or 20 megahertz (MHz), respectively. The system bandwidth may also be partitioned into sub-bands. For example, a sub-band may cover 1.08 MHz (i.e., 6 resource blocks), and there may be 1, 2, 4, 8 or 16 sub-bands for a corresponding system bandwidth of 1.25, 2.5, 5, 10, 15 or 20 MHz, respectively.

Figure 2:
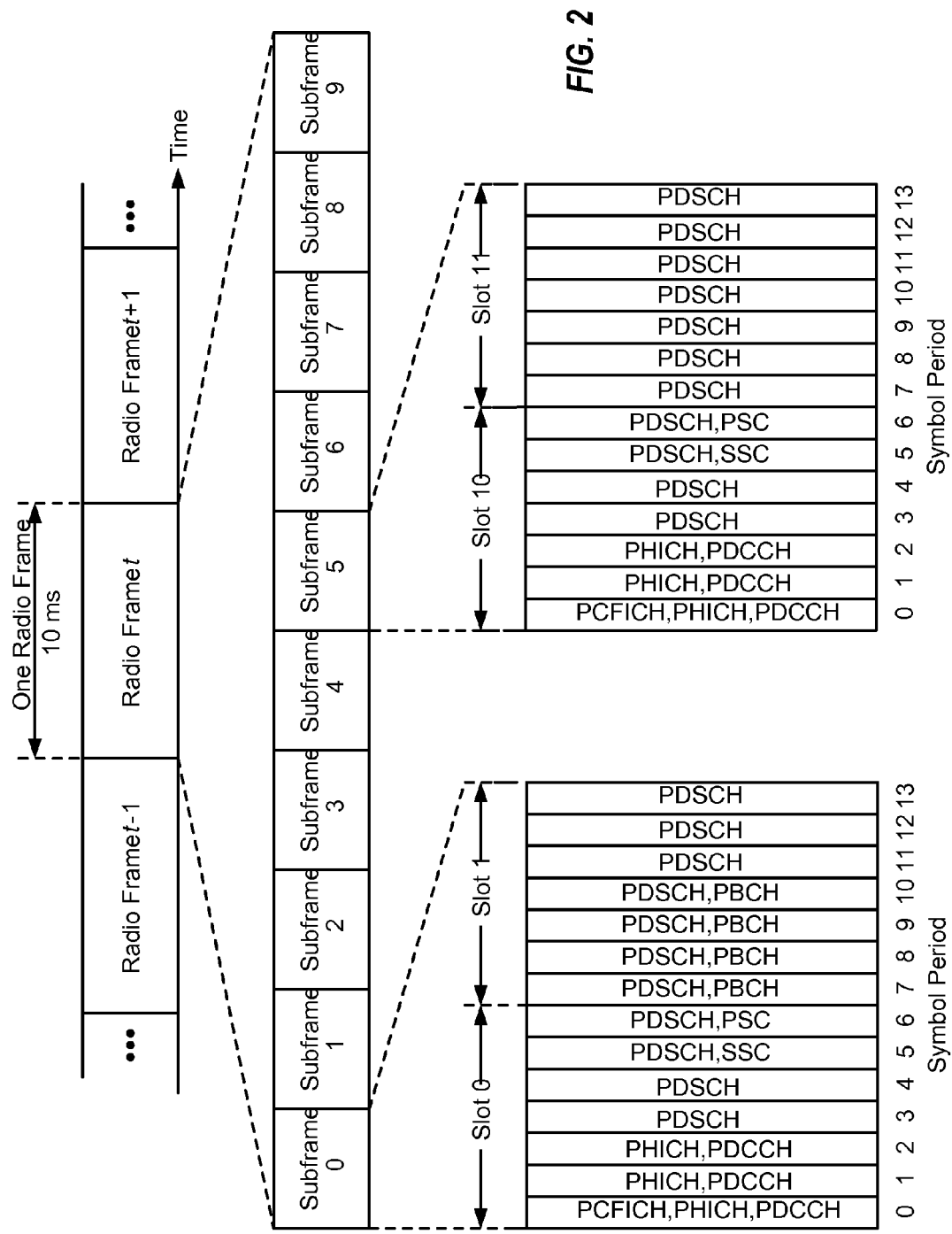
FIG. 2 is a diagram conceptually illustrating an example of a downlink frame structure in a telecommunications system.

FIG. 2 shows a downlink FDD frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each subframe may be assigned indices of 0 through 2L-1. The available time frequency resources may be partitioned into resource blocks. Each resource block may cover N subcarriers (e.g., 12 subcarriers) in one slot.

In LTE, an eNodeB may send a primary synchronization signal (PSC or PSS) and a secondary synchronization signal (SSC or SSS) for each cell in the eNodeB. For FDD mode of operation, the primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. For FDD mode of operation, the eNodeB may send a Physical Broadcast Channel (PBCH) in symbol periods 0 to 3 in slot 1 of subframe 0. The PBCH may carry certain system information.

The eNodeB may send a Physical Control Format Indicator Channel (PCFICH) in the first symbol period of each subframe, as seen in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNodeB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support hybrid automatic retransmission (HARQ). The PDCCH may carry information on uplink and downlink resource allocation for UEs and power control information for uplink channels. The eNodeB may send a Physical Downlink Shared Channel (PDSCH) in the remaining symbol periods of each subframe. The PDSCH may carry data for UEs scheduled for data transmission on the downlink.

The eNodeB may send the PSC, SSC and PBCH in the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to groups of UEs in specific portions of the system bandwidth. The eNodeB may send the PSC, SSC, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. For symbols that are used for control channels, the resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 36 or 72 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for all UEs in the PDCCH. An eNodeB may send the PDCCH to the UE in any of the combinations that the UE will search.

A UE may be within the coverage of multiple eNodeBs. One of these eNodeBs may be selected to serve the UE. The serving eNodeB may be selected based on various criteria such as received power, path loss, signal-to-noise ratio (SNR), etc.

Figure 3:
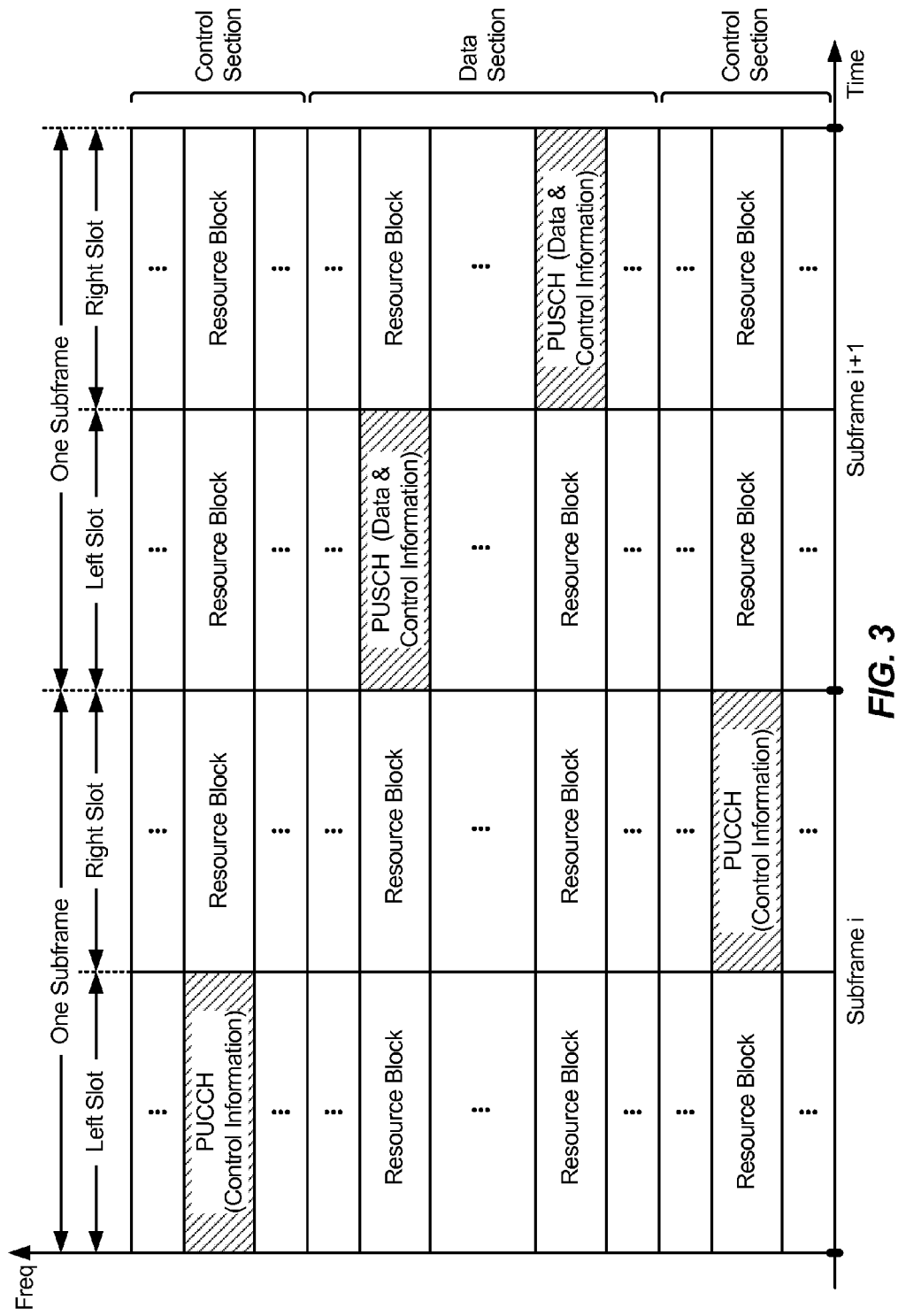
FIG. 3 is a block diagram conceptually illustrating an example frame structure in uplink communications.

FIG. 3 is a block diagram conceptually illustrating an exemplary FDD and TDD (non-special subframe only) subframe structure in uplink long term evolution (LTE) communications. The available resource blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 3 results in the data section including contiguous subcarriers, which may allow a single UE to be assigned all of the contiguous subcarriers in the data section.

A UE may be assigned resource blocks in the control section to transmit control information to an eNodeB. The UE may also be assigned resource blocks in the data section to transmit data to the eNode B. The UE may transmit control information in a Physical Uplink Control Channel (PUCCH) on the assigned resource blocks in the control section. The UE may transmit only data or both data and control information in a Physical Uplink Shared Channel (PUSCH) on the assigned resource blocks in the data section. An uplink transmission may span both slots of a subframe and may hop across frequency as shown in FIG. 3. According to one aspect, in relaxed single carrier operation, parallel channels may be transmitted on the UL resources. For example, a control and a data channel, parallel control channels, and parallel data channels may be transmitted by a UE.

The PSC, SSC, CRS, PBCH, PUCCH, PUSCH, and other such signals and channels used in LTE/-A are described in 3GPP TS 36.211, entitled "Evolved Universal Terrestrial Radio Access (E-UTRA); Physical Channels and Modulation," which is publicly available.

Figure 4:
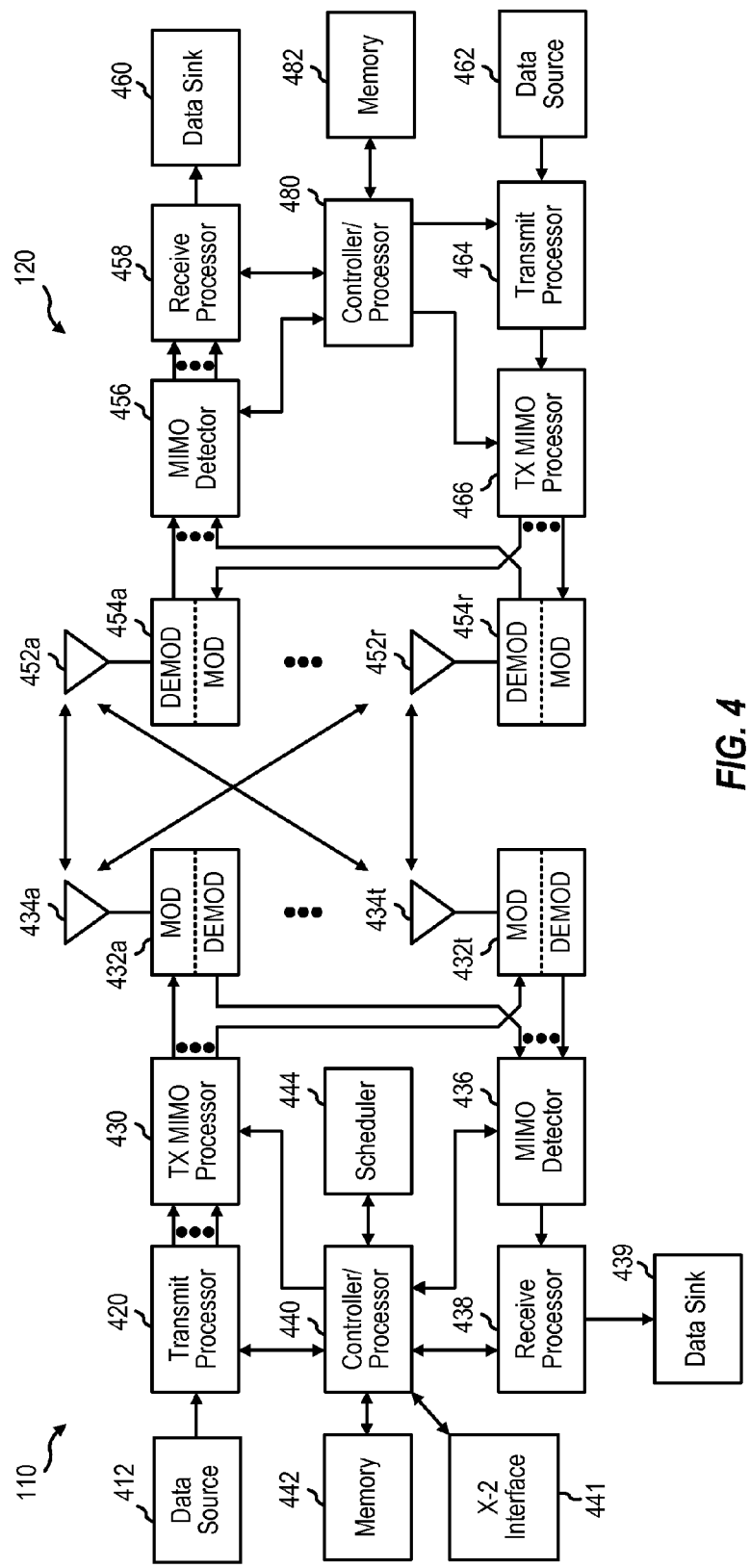
FIG. 4 is a block diagram conceptually illustrating a design of a base station/eNodeB and a UE configured according to one aspect of the present disclosure.

FIG. 4 shows a block diagram of a design of a base station/eNodeB 110 and a UE 120, which may be one of the base stations/eNodeBs and one of the UEs in FIG. 1. The base station 110 may be the macro eNodeB 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the PBCH, PCFICH, PHICH, PDCCH, etc. The data may be for the PDSCH, etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the PUSCH) from a data source 462 and control information (e.g., for the PUCCH) from the controller/processor 480. The processor 464 may also generate reference symbols for a reference signal. The symbols from the transmit processor 464 may be precoded by a TX MIMO processor 466 if applicable, further processed by the modulators 454a through 454r (e.g., for SC-FDM, etc.), and transmitted to the base station 110. At the base station 110, the uplink signals from the UE 120 may be received by the antennas 434, processed by the demodulators 432, detected by a MIMO detector 436 if applicable, and further processed by a receive processor 438 to obtain decoded data and control information sent by the UE 120. The processor 438 may provide the decoded data to a data sink 439 and the decoded control information to the controller/processor 440. The base station 110 can send messages to other base stations, for example, over an X2 interface 441.

The controllers/processors 440 and 480 may direct the operation at the base station 110 and the UE 120, respectively. The processor 440 and/or other processors and modules at the base station 110 may perform or direct the execution of various processes for the techniques described herein. The processor 480 and/or other processors and modules at the UE 120 may also perform or direct the execution of the functional blocks illustrated in use method flow chart FIG. 5, and/or other processes for the techniques described herein. The memories 442 and 482 may store data and program codes for the base station 110 and the UE 120, respectively. A scheduler 444 may schedule UEs for data transmission on the downlink and/or uplink.

Power Consumption and Multi-Thread Processors

Base stations within a wireless communication network may use similar or different radio access technologies (RATs). Different wireless communication standards support different uplink and downlink communication rates. Table 1 below illustrates uplink and downlink data rates supported by various standards.

TABLE 1

| Standard | Downlink (Mbit/second) | Uplink (Mbit/second) |
|---|---|---|
| WiMax | 128 (in 20 MHz channel) | 56 (in 20 MHz channel) |
| LTE | 100 (in 20 MHz channel) | 50 (in 20 MHz channel) |
| HSPA+ | 84 | 22 |
| HSDPA + HSUPA | 14.4 | 5.76 |
| UMTS W-CDMA | 0.384 | 0.384 |
| UMTS-TDD | 16 | 16 |
| EV-DO Rev. B | $4.9 \times N$ | $1.8 \times N$ |
| EV-DO 1x Rev. A | 3.1 | 1.8 |
| EV-DO 1x Rev. 0 | 2.45 | 0.15 |
| TD-SCDMA | 2.048 | 2.048 |
| EDGE Evolution | 1.9 | 0.9 |
| GPRS | 0.08 | 0.02 (Class 8 & 10 and CS-4) |
| GPRS | 0.06 | 0.04 (Class 10 and CS-4) |
| High Speed Circuit Switched Data (HSCSD) | 0.0288 | 0.0144 |

TABLE 1-continued

| Standard | Downlink (Mbit/second) | Uplink (Mbit/second) |
|---|---|---|
| HSCSD | 0.0432 | 0.0144 |
| Circuit Switched data (CSD) | 0.0096 | 0.0096 |

Base stations within the same network using a same RAT may be configured with different data rate capabilities depending on various factors including the date on which the base station was installed, whether it has been upgraded, what hardware is included in the base station, etc. For example, a newly installed base station may be capable of significantly higher data rates than one that was installed several years earlier and is still in operation. Base stations with different capabilities may be divided into different categories within a communications protocol where the categories identify the data rate capabilities of the various base stations. For example, Table 2 below illustrates different categories of base station capabilities in the HSPA (High Speed Packet Access) communication protocol.

TABLE 2

| Protocol | Category | Max. data rate (Mbit/second) |
|---|---|---|
| HSDPA | 1 | 1.2 |
| HSDPA | 2 | 1.2 |
| HSDPA | 3 | 1.8 |
| HSDPA | 4 | 1.8 |
| HSDPA | 5 | 3.6 |
| HSDPA | 6 | 3.6 |
| HSDPA | 7 | 7.2 |
| HSDPA | 8 | 7.2 |
| HSDPA | 9 | 10.1 |
| HSDPA | 10 | 14 |
| HSDPA | 11 | 0.9 |
| HSDPA | 12 | 1.8 |
| HSPA+ | 13 | 17.6 |
| HSPA+ | 14 | 21.1 |
| HSPA+ | 15 | 23.4 |
| HSPA+ | 16 | 28 |
| HSPA+ | 19 | 35.3 |
| HSPA+ | 20 | 42.2 |
| Dual-Cell HSDPA | 21 | 23.4 |
| Dual-Cell HSDPA | 22 | 28 |
| Dual-Cell HSDPA | 23 | 35.3 |
| Dual-Cell HSDPA | 24 | 42.2 |
| DC-HSDPA w/MIMO | 25 | 46.7 |
| DC-HSDPA w/MIMO | 26 | 55.9 |
| DC-HSDPA w/MIMO | 27 | 70.6 |
| DC-HSDPA w/MIMO | 28 | 84.4 |

In order to communicate with each category of potential base station within a communication protocol, a protocol compatible mobile device or user equipment (UE) should be capable of communicating at each potential data rate specified in the available categories. Further, mobile devices that are capable of communicating using more than one protocol may be capable of supporting the various potential data rates of base stations employing each protocol available to the mobile device. Typically, a mobile device will employ a hardware configuration capable of processing data at the highest rate available. This may lead to the mobile device using more hardware processing power than is desired for a particular base station category or actually available data rate.

Certain mobile devices may be equipped with hardware containing multiple processing units, called threads. This multiple hardware thread architecture allows multiple processing threads in the mobile device to operate at the same time. Processors including multiple threads are sometimes called interleaved multi-threaded (IMT) processors. A mobile device may include one or more multi-threaded processor. Such multiple threads may be used to ensure compatibility with base stations of varying data rate capabilities. A multiple hardware thread architecture consumes more battery power than a single thread architecture. To support various data rates described above, a varying number of hardware threads may be active at a particular point in time. Multiple active processing resources such as hardware threads may lead to an increase in power consumption.

Offered is a method for reducing power consumption and increasing battery life for mobile devices employing a multi-thread based architecture. The proposed method adjusts the hardware processing of the mobile device when the mobile device switches from one type of base station to a different type of base station (or switches from one RAT to another RAT) to conserve battery power. Based on the base station or RAT's category or maximal data rate, the mobile device may reconfigure the hardware to activate new hardware threads or deactivate existing active hardware threads or to increase or to decrease the processor frequency. The mobile device may adjust its active hardware processing capability to desirably match the available data rate from the base station. Without using the proposed approach, a mobile device may continually operate using its highest performance processing configuration, even if much of that processing power is wasted when communicating with a base station that does not support data rates sufficient to desirably match the mobile device's full processing power. Overuse of processing power will result in the mobile device consuming its battery power faster than traditional single mode (single thread) and dual mode mobile devices designed to handle lower data rate traffic.

Figure 5:
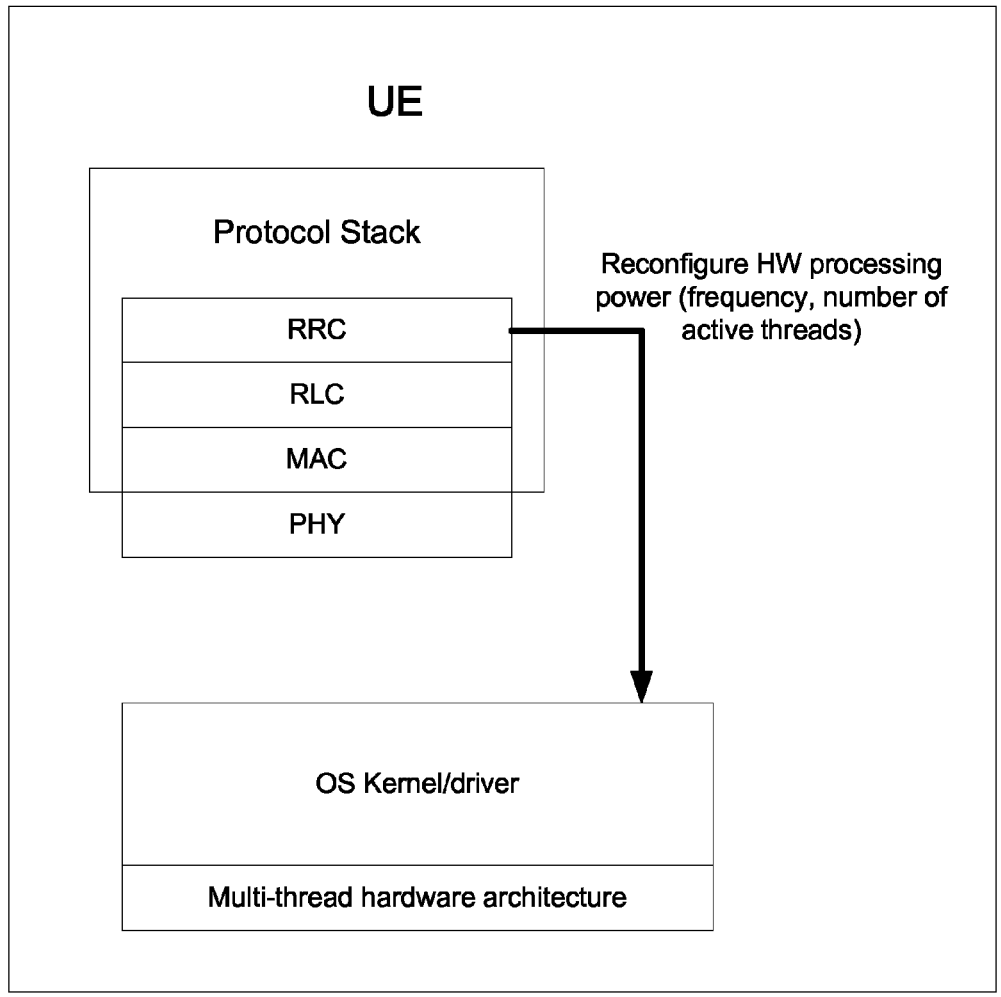
FIG. 5 is a block diagram illustrating operation of a mobile device according to one aspect of the present disclosure.

As shown in FIG. 5, the proposed scheme may use the mobile device's protocol stack RRC (Radio Resource Control) unit to identify base station or RAT changes and to reconfigure the hardware processing power including the number of active hardware threads and the hardware processing frequency.

To reduce multi-thread based architecture power consumption, the associated hardware processing capability of a mobile device may be reconfigured based upon the maximal data rate provided by a base station to which the mobile device is connected.

The associated hardware processing capability may be decided by the frequency of the clock rate used by the processor and other hardware components such as bus and memory, as well as by the number of active hardware threads. In one aspect, the time of all-waits for the mobile device is increased. An all-waits period is a time period during which all hardware threads are inactive, such as in a shallow sleep mode. Typically, the more hardware threads used by a multi-thread architecture, the less all-waits time the architecture can achieve. However by increasing an all-waits period, a significant amount of power may be saved.

To improve power consumption when changing between base stations, a mobile device may identify specific base stations as operating with desired data rates. This may occur in the mobile device's RRC unit. The RRC unit may identify desirable base stations for handover purposes. If a desired base station is configured using a different data rate category, the RRC unit may inform the associated hardware processing unit to adjust its processing capability. The RRC unit may adjust the number of active hardware threads and their associated processor frequency to achieve more all-waits periods, thus improving power saving in the mobile device.

In one aspect, the method for configuring a mobile device's multi-thread architecture is performed as follows. When the mobile device is powered up (or otherwise activated from an inactive mode) a default low power consumption configuration is used to configure the hardware to process the sending and receiving traffic between the mobile device and the network. Once the mobile device connects to a network, the RAT is decided and the cell configuration information is acquired from the information broadcast by the connected base station. The mobile device's RRC unit may use this cell configuration to derive the corresponding desired hardware configuration to achieve a lower power consumption while also configuring the mobile device to handle the maximal data rate the connected base station can support.

When a mobile device moves out of its current base station coverage area and connects to a new base station, the following operations may be performed. If the handover (new) base station uses the same RAT but with a different category, the mobile device will discover this by acquiring the handover base station broadcast information. The mobile device may then use this cell configuration to derive the corresponding desired hardware configuration and to adjust the current hardware configuration to handle the maximal data rate that the new base station can support.

If the new base station uses a different RAT, the mobile device will discover this by acquiring the handover base station broadcast information. The mobile device may then use this cell configuration to derive the corresponding desired hardware configuration and to adjust the current hardware configuration to handle the maximal data rate that the new base station can support.

If the new base station uses the same RAT and the same category, the mobile device will discover this by acquiring the handover cell broadcast information. The mobile device may then continue using the existing hardware configuration.

The power savings that may be achieved by the disclosed methods may be significant. In one example, a mobile device with six hardware threads and three hours of battery life left, can save 90% of its processing power by being in an all-waits state.

The case when the mobile device roams among different RATs will now be discussed. In the LTE network, the device will support very high data rates and may be configured to use all six active hardware threads, resulting in almost no power savings. When the device moves to the HSPA network, the data rate supported by the network drops as shown above in Table 1. Without reconfiguring the mobile device, in a 10 Mbps downlink data rate scenario, the mobile device can save 18% of its processing power. However using a three active hardware thread configuration, the device may now save up to 30% of its processing power. Thus, by reconfiguring the mobile device's active hardware threads, the device can operate 12% longer in the HSPA network at data speeds of 10 Mbps (megabits-per-second) downlink. When the mobile device moves to the EDGE network, if the device continues to use its six active hardware threads, its power saving is 25%. If the mobile device uses one or two active hardware threads, its power saving is 60%. Thus, by reconfiguring the mobile device's active hardware threads, the device can operate 35% longer in the EDGE network at data speeds of 1.9 Mbps downlink.

In another example, the same mobile device only roams to base stations operating under the HSPA protocol, where the base stations have different data rate categories. Assume the battery power allows the mobile station to connect to a HSPA category 28 base station coverage area for 1 hour, then to a HSPA category 9 base station coverage area for 1 hour, and then to a HSPA category 4 base station coverage area for 1 hour.

Because HSPA category 28 base station can provide up to a 84 Mbps downlink data rate, the mobile station is configured to use all six hardware threads, resulting in almost no power savings. When the mobile device moves into the coverage area of the HSPA category 9 base station, the data rate supported by the network drops to a maximal downlink rate of 10 Mbps, as shown in Table 2. Without reconfiguring the mobile device, in a 10 Mbps downlink data rate scenario the mobile device can save 18% of processing power. Using a configuration of only three active hardware threads, the mobile device can save up to 30% of its processing power. Thus, by reconfiguring the mobile device's active hardware threads, the mobile device can operate 12% longer in the HSPA category 9 base station coverage area. When the mobile device moves to the HSPA category 4 base station coverage area, if the mobile device is still configured to operate six active hardware threads, its power saving is 25%. If the mobile device is configured to use one or two active hardware threads, its power saving is 60%. Thus, by reconfiguring the mobile device's active hardware threads, the mobile device can operate 35% longer in the HSPA category 4 base station coverage area.

In one aspect the mobile device may reduce its power consumption by increasing its all-waits time. Doing so may include activating additional hardware threads or other processing resources to accomplish certain tasks more quickly, thereby enabling the mobile device to enter an all-waits state earlier than it otherwise might have been able to.

In another aspect the mobile device having a batter power availability below a certain threshold may enter a power conservation mode which results in the mobile device choosing to operate at a reduced rate capacity. The mobile device may report that reduced rate capacity to a serving base station, thereby allowing communications to continue at the reduced rate. The mobile device may then adjust the number of active processing resources to operate in the power conservation mode. The adjusting may include reducing the number of active resources in accordance with the reduced data rate capability, but may also include temporarily increasing the number of active resources so that an eventual period of all-waits may be increased. In adjusting the number of active resources, the mobile device may increase the time it can operate in the power consumption mode.

Figure 6:
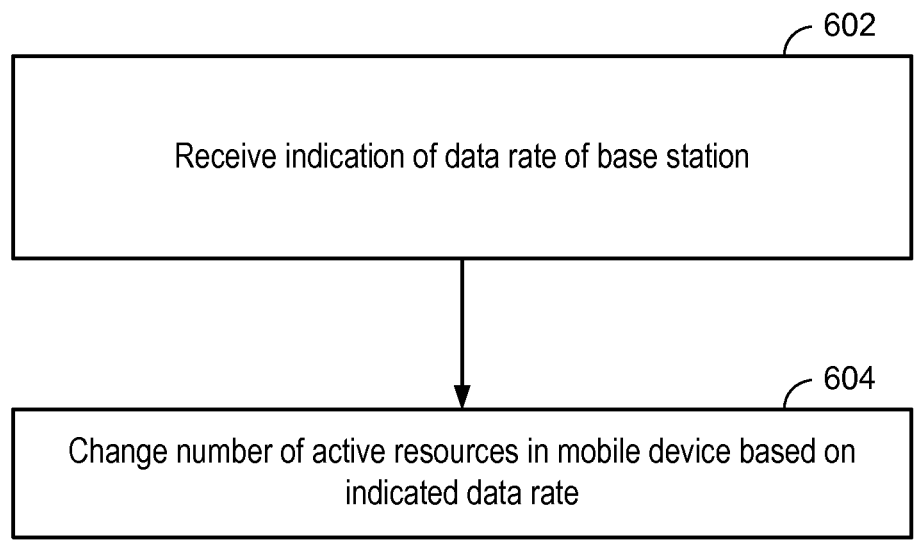
FIG. 6 is a block diagram illustrating reducing power consumption in a multi-threaded mobile device according to one aspect of the present disclosure.

FIG. 6 is a diagram illustrating reducing power consumption according to one aspect of the present disclosure. As shown in block 602 a mobile device receives an indication of a data rate of a base station serving the mobile device. As shown in block 604 the mobile device dynamically changes a number of active resources in the mobile device based on the indicated data rate of the base station serving the mobile device.

In one configuration, a mobile device is configured for wireless communication including means for receiving an indication of a data rate of a base station serving the mobile device and means for dynamically changing a number of active resources in the mobile device based on the indicated data rate of the base station serving the mobile device. In one aspect, the aforementioned means may be a receive processor 458, a controller/processor 480, memory 482, and/or transmit processor 464. In another aspect, the aforementioned means may be a module or any apparatus configured to perform the functions recited by the aforementioned means.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of controlling power consumption of a mobile device, the method comprising:
   during switching from a first base station to a second base station, or from one radio access technology to another radio access technology:
   receiving an indication of a data rate capability of said second base station;
   dynamically activating or deactivating one or more hardware threads in the mobile device based on the indicated data rate capability of the second base station;
   in which the dynamically activating or deactivating comprises increasing a time during which all hardware threads are inactive; and
   in which the dynamically activating or deactivating comprises temporarily activating one or more hardware threads so that the time during which all hardware threads are inactive is eventually increased.

2. The method of claim 1, further comprising:
   reporting a reduced rate capability of the mobile device when the mobile device has a battery power below a threshold; and
   deactivating hardware threads in accordance with the reported reduced data rate capability of the mobile device.

3. The method of claim 1, in which the dynamically activating or deactivating is based on increasing a time in a low power state of the mobile device.

4. An apparatus for controlling power consumption of a mobile device, the apparatus comprising:
   means for, during switching from a first base station to a second base station or from one radio access technology to another radio access technology, receiving an indication of a data rate capability of said second base station;
   means for, during switching from the first base station to the second base station, dynamically activating or deactivating one or more hardware threads in the mobile device based on the indicated data rate capability of the second base station;
   in which the means for dynamically activating or deactivating comprises means for increasing a time during which all hardware threads are inactive; and
   in which the means for dynamically activating or deactivating comprises means for temporarily activating one or more hardware threads so that the time during which all hardware threads are inactive is eventually increased.

5. The apparatus of claim 4, in which the means for dynamically activating or deactivating is based on increasing a time in a low power state of the mobile device.

6. A computer program product for controlling power consumption of a mobile device, the computer program product comprising:
- a non-transitory computer-readable medium having non-transitory program code recorded thereon, the program code comprising:
- program code to, during switching from a first base station to a second base station or from one radio access technology to another radio access technology, receive an indication of a data rate capability of said second base station;
- program code to, during switching from the first base station to the second base station, dynamically activate or deactivate one or more hardware threads in the mobile device based on the indicated communication protocol, category, and maximal data rate capability of the second base station;
- in which the program code to dynamically activate or deactivate one or more hardware threads comprises program code to increase a time during which all hardware threads are inactive; and
- in which the program code to dynamically activate or deactivate one or more hardware threads comprises program code to temporarily activate one or more hardware threads so that the time during which all hardware threads are inactive is eventually increased.

7. The computer program product of claim 6, in which the program code to dynamically activate or deactivate one or more is based on increasing a time in a low power state of the mobile device.

8. An apparatus for controlling power consumption of a mobile device, the apparatus comprising: a memory; and at least one processor coupled to the memory, the at least one processor being configured:
- to receive, during switching from a first base station to a second base station or from one radio access technology to another radio access technology, an indication of a data rate capability of said second base station;
- to dynamically activate or deactivate, during switching from the first base station to the second base station, one or more active hardware threads in the mobile device based on the indicated data rate capability of the second base station;
- in which the at least one processor configured to dynamically activate or deactivate comprises the at least one processor configured to increase a time during which all hardware threads are inactive; and
- in which the at least one processor is configured to temporarily activate one or more hardware threads so that the time during which all hardware threads are inactive is eventually increased.

9. The apparatus of claim 8, in which the at least one processor is further configured:
- to report a reduced rate capability of the mobile device when the mobile device has a battery power below a threshold; and
- to deactivate the number of active hardware threads in accordance with the reduced data rate capability of the mobile device.

10. The apparatus of claim 8, in which the at least one processor is configured to dynamically activate or deactivate based on increasing a time in a low power state of the mobile device.

* * * * *